(12) United States Patent
Bush et al.

(10) Patent No.: US 8,458,657 B2
(45) Date of Patent: Jun. 4, 2013

(54) DOCUMENTATION ROADMAPS AND COMMUNITY NETWORKING FOR DEVELOPERS ON LARGE PROJECTS

(75) Inventors: Christopher L. Bush, Austin, TX (US); Lik Cheung, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/486,833

(22) Filed: Jun. 18, 2009

(65) Prior Publication Data
US 2010/0325613 A1     Dec. 23, 2010

(51) Int. Cl.
*G06F 9/44*     (2006.01)

(52) U.S. Cl.
USPC .......................................... 717/120; 717/122

(58) Field of Classification Search
USPC ....................................................... 705/301
See application file for complete search history.

(56) References Cited

U.S. PATENT DOCUMENTS

| | | | |
|---|---|---|---|
| 5,765,140 A * | 6/1998 | Knudson et al. ............. | 705/7.15 |
| 6,438,743 B1 | 8/2002 | Boehm et al. | |
| 7,082,457 B1 * | 7/2006 | Burianek et al. .............. | 709/204 |
| 7,263,696 B1 | 8/2007 | Gruttadauria et al. | |
| 2003/0041051 A1 | 2/2003 | Spenser et al. | |
| 2003/0051230 A1 | 3/2003 | Molchanov et al. | |
| 2005/0226597 A1 | 10/2005 | Cobb et al. | |
| 2006/0149773 A1 | 7/2006 | Sherwood | |
| 2006/0200372 A1 * | 9/2006 | O'Cull et al. ..................... | 705/8 |
| 2006/0259499 A1 | 11/2006 | Moulckers et al. | |
| 2007/0150433 A1 | 6/2007 | Chen | |
| 2007/0208667 A1 | 9/2007 | Boctor et al. | |
| 2007/0220068 A1 | 9/2007 | Thompson et al. | |

OTHER PUBLICATIONS

USPTO U.S. Appl. No. 136/418,644, 1 page.
Kurtz, Benjamin, "SOFTVIZ: A Runtime Software Visualization Environment", Thesis, Submitted to the Computer Science Department, Worcester Polytechnic Institute, 2003, 90 pages.

* cited by examiner

*Primary Examiner* — Don Wong
*Assistant Examiner* — Deric Ortiz
(74) *Attorney, Agent, or Firm* — Stephen R. Tkacs; Stephen J. Walder, Jr.; David A. Mims, Jr.

(57) ABSTRACT

A version control system includes a mechanism for a learning roadmap based on information available from a source repository. More particularly, the mechanism generates an easily understandable timeline of a project and a directory of developers based on information available in the version control system that contains the source content of a project. The timeline for the project may be tied to the directory of developers. Under each date in the timeline, a list of developers and their roles and commits may be listed.

16 Claims, 3 Drawing Sheets

DOCUMENTATION ROADMAPS AND COMMUNITY NETWORKING FOR DEVELOPERS ON LARGE PROJECTS

BACKGROUND

The present application relates generally to an improved data processing apparatus and method and more specifically to an apparatus and method for generating documentation roadmaps and facilitating community networking for developers, particularly new developers, on large software projects.

Software projects, large and small alike, undergo many revisions. A software release is the distribution, whether public or private, of an initial or new and upgraded version of a computer software product. Each time a software program or system is changed, the software engineers and company doing the work decide on how to distribute the program or system, or changes to that program or system. Software patches are one method of distributing the changes, as are downloads and compact discs.

A software release life cycle is composed of different stages that describe the stability of a piece of software and the amount of development it requires before final release. Each major version of a product usually goes through a stage when new features are added, or the alpha stage; a stage when it is being actively debugged, or the beta stage; and finally a stage when all important bugs have been removed, or the stable stage. A software project may also have one or more intermediate stages.

Source control or source code management (SCM), also referred to as revision control, manages multiple revisions of the same unit of information. SCM is most commonly used in engineering and software development to manage ongoing development of digital documents like application source code, art resources such as blueprints or electronic models, and other projects that may be worked on by a team of people. Changes to these documents are usually identified by incrementing an associated number or letter code, termed the "revision number," "revision level," or simply "revision," and associated historically with the person making the change.

Version control systems are most commonly stand-alone applications, and software tools for revision control are increasingly recognized as being necessary for the organization of multi-developer projects. When a version is submitted to a version control system, this is typically referred to as a "commit." A version control system typically attaches a small amount of metadata to a version at the time of the commit. Metadata is "data about data," and in this instance, the metadata may identify, for example, the person submitting the version, bugs that were fixed, features that were added, and so on.

SUMMARY

In one illustrative embodiment, a method, in a data processing system, is provided for automating a learning roadmap based on information available from a version control system. The method comprises receiving a commit for a project with associated metadata. The metadata comprises contact information for a developer providing the commit. The method further comprises adding the commit with associated metadata to a content repository for the project, generating a developer directory based on metadata in the content repository, and generating a timeline based on metadata in the content repository.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for automating a learning roadmap based on information available from a version control system. More particularly, the mechanism generates an easily understandable timeline of a project and a directory of developers based on the information available in the version control system that contains the source code of a project. As an example, when generating the directory, if a person in the version control system always commits a particular file type, that person may be identified as a lead contact for that particular file type. Similarly, if a person has the highest number of commits for the project, that person may be identified as the primary contact for the project. The timeline for the project may be tied to the directory of developers. Under each date in the timeline, a list of developers and their roles and commits may be listed. If a developer is hired to do work in a particular area, a custom timeline relating only to that area may be generated.

Figure 1:
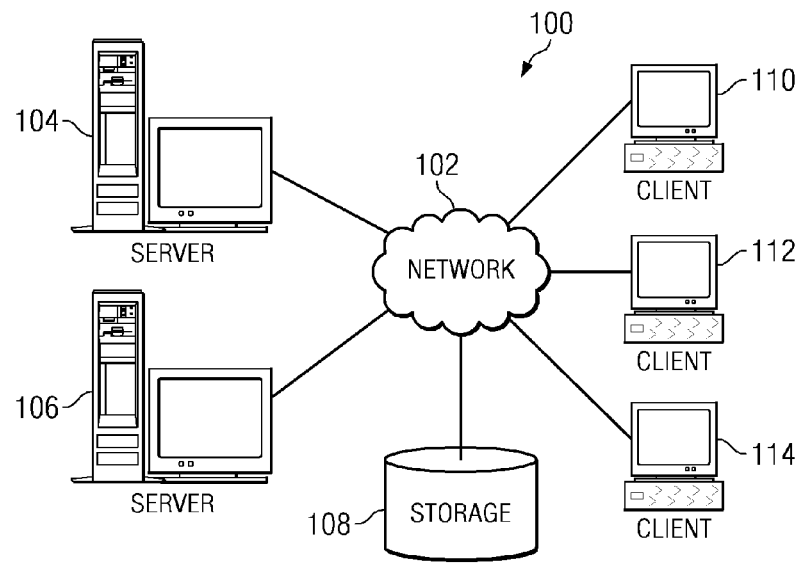
FIG. 1 depicts a pictorial representation of an example distributed data processing system in which aspects of the illustrative embodiments may be implemented.
Figure 2:
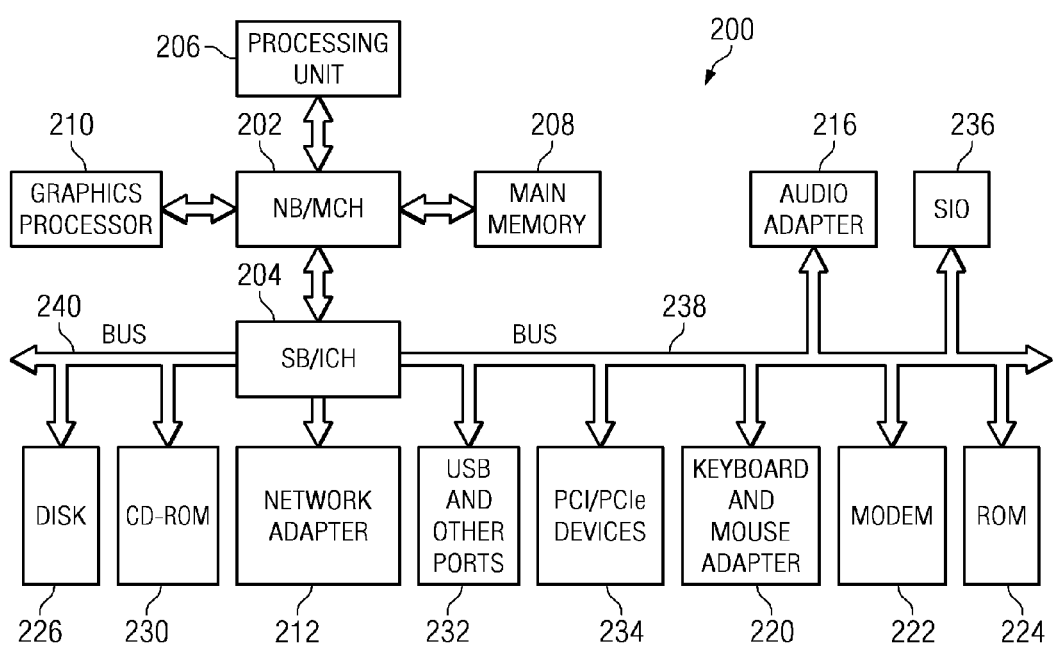
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SC/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
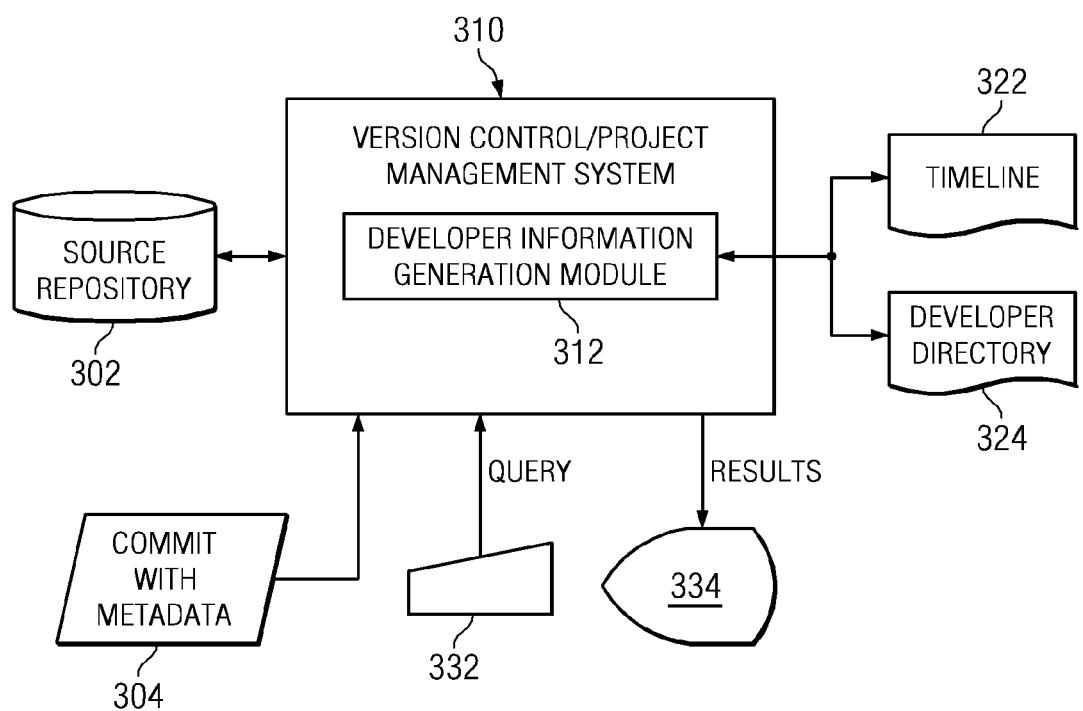
FIG. 3 is a block diagram illustrating a software development environment in accordance with an illustrative embodiment.

FIG. 3 is a block diagram illustrating a software development environment in accordance with an illustrative embodiment. Version control/project management system 310 maintains source repository 302. Version control system 310 manages multiple revisions of the same unit of information, which in this embodiment is source code for a software project in source repository 302. A developer working on the software project may submit a commit with metadata 304, which version control/project management system 310 stores in source repository 302. Whenever someone generates a commit 304, some metadata is attached. The metadata may include, for example login identifier (ID) of the developer making the commit and the time of the commit.

Version control/project management system 310 may comprise a server running version control system software. For example, version control/project management system 310 may be software running on a server, such as server 104 in FIG. 1. Version control/project management system 310 may be a standalone system, may run in a partition on a server, or may be incorporated into an integrated development environment (IDE), for example.

Version control system/project management system 310 may generate a current version of the software project and compile the metadata to form a version of the software project for installation, analysis, testing, debugging, or the like. Version control system/project management system 310 may generate documentation, such as a readme file, for example, which comprises a list of features, bugs fixed, troubleshooting information, instructions for use, and so forth. Large software projects may undergo many, many revisions made by a large number of developers. Prior art documentation tools are not tied to the constantly changing source repository, so often they are out of date and do not have a chronological ordering associated with them for new developers to consume.

In accordance with an illustrative embodiment, version control system 310 adds information to the metadata attached to commit 304 that allows a user to filter the information in the repository and to generate a timeline for a new developer. For example, commit 304 may include within the metadata the contact information for the developer making the commit, a commit type, software language(s), and other information describing the nature of the commit.

Version control/project management system 310 includes developer information generation module 312, which provides a mechanism to provide a learning roadmap based on the information (metadata) available in source repository 302. Developer information generation module 312 may be a component of the version control/project management system 310 software, a plugin, a companion program, or the like. Developer information generation module 312 may create a timeline 322 for the software project and a developer directory 324. Timeline 322 may be tied to developer directory 324. Under each date in the timeline, a list of developers and their roles and commits may be listed. For example, if a developer is hired to do work in the Java™ programming system, and the code base contains code in a variety of languages, developer information generation module 312 may generate a custom timeline relating only to the Java™ source files.

Developer information generation module 312 may perform data mining on the metadata in source repository 302 to generate a very specific developer directory 324. For example, if a developer always commits structured query language (SQL) files, developer information generation module 312 may identify that developer as a primary contact for SQL. If a developer has the highest number of commits in the software project, then developer information generation module 312 may identify that particular developer as the primary contact for the software project. Developer information generation module 312 may perform more sophisticated algorithms to identify a developer with a highest number of commits in a sliding window, a highest number of commits of new source code, a highest number of commits with bug fixes, etc. Therefore, developer information generation module 312 may provide a very specialized developer directory, which may identify, for example, a project leader, a primary SQL contact, a primary graphical user interface (GUI) contact, a primary troubleshooting contact, and so forth.

Furthermore, version control/project management system 310 may allow a user to submit a query via an input device 332. Input device 332 may be, for example, a keyboard or mouse; however, version control/project management system 310 may receive the query over a network, such as network 102 in FIG. 1. The query may identify key words or date ranges, for example. Version control/project management system 310 and, more particularly, developer information generation module 312 may search timeline 322 and developer directory 324 or even source repository 302 to identify information satisfying the query and return results to output device 334. Output device 334 may be, for example, a computer monitor; however, version control/project management system 310 may return results over a network, such as network 102 in FIG. 1.

Thus, a new developer, for example, may view timeline 322, which is tied to developer directory 324, to get up to date on the project and easily have a contact base to answer questions. This may also help a new developer build a networking community within a company. Also, the descriptions available to version control/project management system 310 provides basic chronological documentation to be built as needed. A developer may also submit a very specific query with one or more keywords or date ranges and receive a customized timeline or list of developer contacts.

Furthermore, version control/project management system 310 may identify a primary contact for code maintenance or design purposes. For example, version control/project management system 310 may periodically request feedback or documentation from a primary contact. As another example, version control/project management system 310 may route commit 304 to a primary contact for approval before adding commit 304 to source repository 302.

Developer directory 324 may be hierarchical and may represent the structure or hierarchical nature of the source code management (SCM) update activity using factors such as the frequency and type of updates performed by the developers. The developer with the largest number of commits may be designated as a lead developer or primary contact. Inspection of the type or nature of the commits may designate that the developer is a subordinate developer (i.e., not a lead developer). Once a developer is designated as a lead developer, approval may be required from that developer for changes in areas dealing with the subject matter for which the developer is designated as the lead, particularly from subordinate developers.

Architecture/design/developer/maintenance teams may be identified based on the commit/update activity from the SCM. Thus, subject matter experts may be identified in order to perform other tasks. For example, a developer who consistently provides fixes to a given section of code may be designated as subject matter expert in that code. That developer may further be designated as a selector/advisor when creating an implementation or product support team.

As will be appreciated by one skilled in the an, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
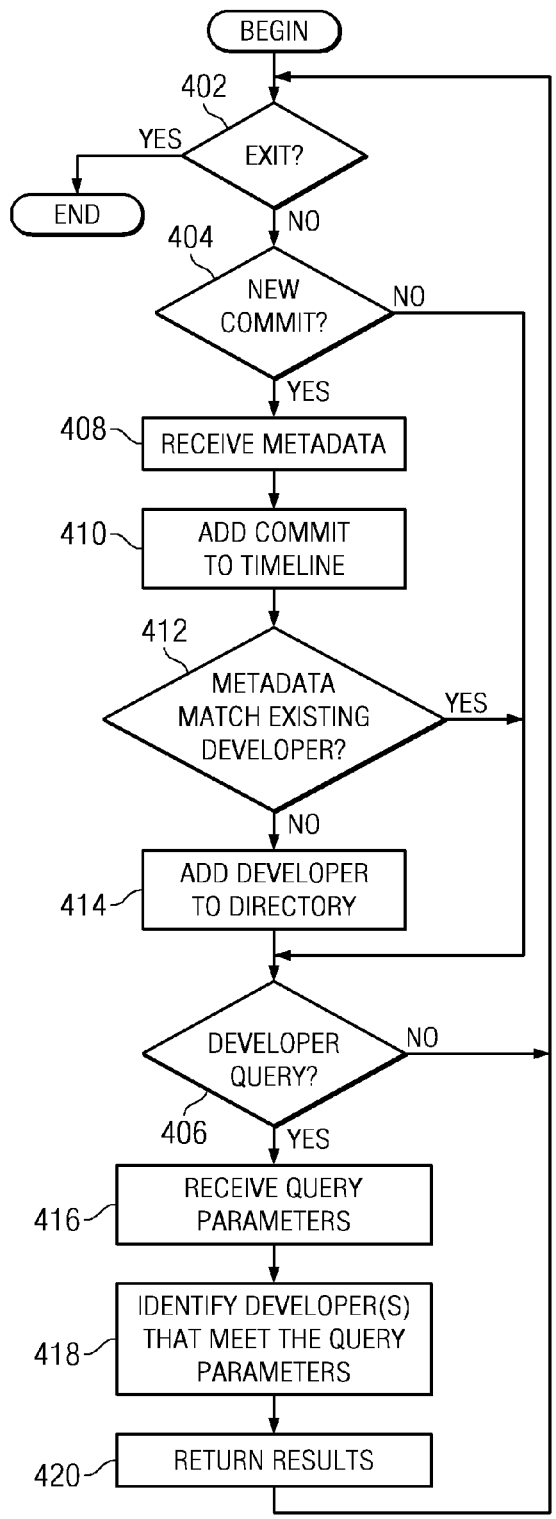
FIG. 4 is a flowchart outlining example operations of a version control system in accordance with an illustrative embodiment.

FIG. 4 is a flowchart outlining example operations of a version control system in accordance with an illustrative embodiment. Operation begins, and the version control system determines whether an exit condition exists (block 402). An exit condition may exist, for example, when an operator closes the version control system software, shuts down the computer running the version control system, or the like. If an exit condition exists, operation ends.

If an exit condition does not exist in block 402, the version control system determines whether a new commit is received (block 404). If a new commit is not received, the version control system determines whether a developer query is received (block 406). If a developer query is not received, operation returns to block 402 to determine whether an exit condition exists.

If a new commit is received in block 404, the version control system receives metadata associated with the commit (block 408). The version control system then adds the commit to a timeline (block 410). The version control system may provide additional information to the timeline by linking the commit to developer information. For example, under each date in the timeline, the version control system may list developers and their roles and commits. If a developer is hired to work in the Java™ programming system, for example, and the source repository contains code in a variety of languages, the version control system may generate a custom timeline relating only to Java™ source files.

Next, the version control system determines whether the metadata received in block 408 matches an existing developer (block 412). If the metadata matches an existing developer, then the developer is already in the developer directory, and operation proceeds to block 406 to determine whether a developer query is received. Although not shown in FIG. 4, the version control system may update the developer directory based on the how frequently or recently the developer provides commits to the source repository, the types of commits, and so forth. The version control system may update the developer directory periodically based on a schedule or in response to a commit. If the metadata does not match an existing developer in block 412, the version control system adds the developer to the developer directory (block 414), and operation proceeds to block 406 to determine whether a developer query is received.

If a developer query is received in block 406, the version control system receives the query parameters (block 416). The query parameters may include keywords, commit types, time ranges, or the like. The version control system then identifies one or more developers that meet the query parameters (block 418) and returns the results to the requesting user (block 420). Thereafter, operation returns to block 402 to determine whether an exit condition exists.

Figure 5:
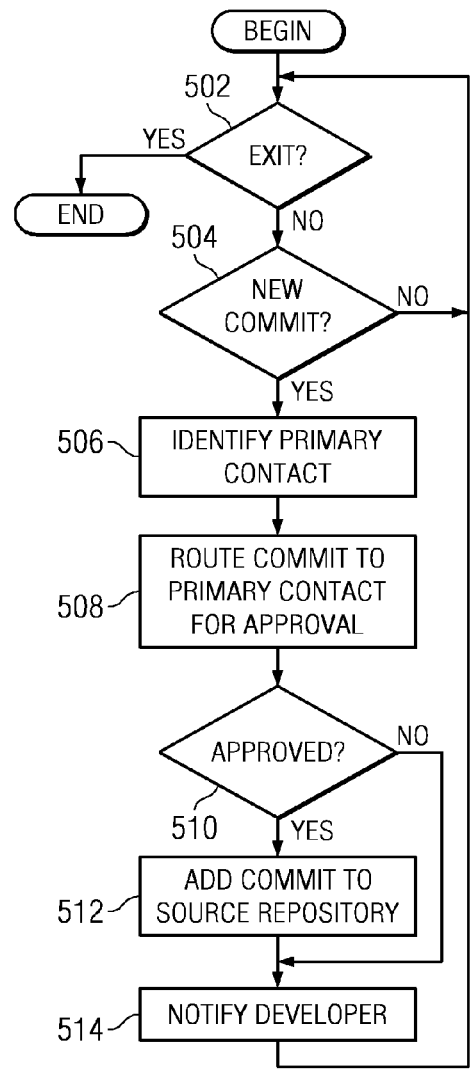
FIG. 5 is a flowchart illustrating operation of a version control system processing a commit in accordance with an illustrative embodiment.

FIG. 5 is a flowchart illustrating operation of a version control system processing a commit in accordance with an illustrative embodiment. Operation begins, and the version control system determines whether an exit condition exists (block 502). An exit condition may exist, for example, when an operator closes the version control system software, shuts down the computer running the version control system, or the like. If an exit condition exists, operation ends.

If an exit condition does not exist in block 502, the version control system determines whether a new commit is received (block 504). If a new commit is not received, operation returns to block 502 to determine whether an exit condition exists. If a new commit is received in block 504, the version control system identifies a primary contact for the commit (block 506). The version control system may identify the primary contact as the primary contact for the software project, a lead contact for a particular commit type, a primary contact for a particular programming language, or the like.

Then, the version control system routes the commit to the identified primary contact for approval (block 508) and waits for the primary contact to approve or disapprove the commit. The version control system may route the commit to a primary contact using a known workflow control system, for example. The version control system then determines whether the identified primary contact approved or rejected the commit (block 510). If the primary contact approved the commit, then the version control system adds the commit to the source repository (block 512) and notifies the developer that submitted the commit that the commit was approved and added (block 514). Thereafter, operation returns to block 502 to determine whether an exit condition exists. If the primary contact does not approve the commit in block 510, the version control system notifies the developer that submitted the commit that the commit was not approved in block 514, and operation returns to block 502 to determine whether an exit condition exists.

Thus, the illustrative embodiments provide mechanisms for automating a learning roadmap based on information available from a version control system. More particularly, the mechanism generates an easily understandable timeline of a project and a directory of developers based on the information available in the version control system that contains the source code of a project. As an example, when generating the directory, if a person in the version control system always commits a particular file type, that person may be identified as a lead contact for that particular file type. Similarly, if a person has the highest number of commits for the project, that person may be identified as the primary contact for the project. The timeline for the project may be tied to the directory of developers. Under each date in the timeline, a list of developers and their roles and commits may be listed. If a developer is hired to do work in a particular area, a custom timeline relating only to that area may be generated.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:

receive a commit for a project with associated metadata, wherein the commit comprises a version of a software component in the project and wherein the metadata comprises contact information for a developer providing the version of the software component;

add the commit with associated metadata to a content repository for the project;

generate a developer directory based on metadata in the content repository; and generate a timeline based on metadata in the content repository.

2. The computer program product of claim 1, wherein generating the developer directory comprises:

identifying a developer with a highest number of commits as a primary contact for the project.

3. The computer program product of claim 1, wherein generating a developer directory comprises:

identifying a developer with a highest number of commits having a given commit type as a primary contact for the given commit type.

4. The computer program product of claim 1, wherein generating a developer directory comprises:

identifying a developer with a highest number of commits for a given programming language as a primary contact for the given programming language.

5. The computer program product of claim 1, wherein the timeline provides for a given date range a list of developers and corresponding roles and commits.

6. The computer program product of claim 1, wherein adding the commit with associated metadata to the content repository comprises:

identifying a primary contact;

routing the commit to the primary contact;

determining whether the primary contact approves the commit; and responsive to the primary contact approving the commit, adding the commit with associated metadata to the content repository.

7. An apparatus, comprising:

a processor; and a memory coupled to the processor, wherein the memory comprises instructions which, when executed by the processor, cause the processor to:

receive a commit for a project with associated metadata, wherein the commit comprises a version of a software component in the project and wherein the metadata comprises contact information for a developer providing the version of the software component;

add the commit with associated metadata to a content repository for the project;

generate a developer directory based on metadata in the content repository; and generate a timeline based on metadata in the source repository.

8. The apparatus of claim 7, wherein generating the developer directory comprises:

identifying a developer with a highest number of commits as a primary contact for the project.

9. The apparatus of claim 7, wherein generating a developer directory comprises:

identifying a developer with a highest number of commits having a given commit type as a primary contact for the given commit type.

10. The apparatus of claim 7, wherein generating a developer directory comprises:

identifying a developer with a highest number of commits for a given programming language as a primary contact for the given programming language.

11. The apparatus of claim 7, wherein the timeline provides for a given date range a list of developers and corresponding roles and commits.

12. The apparatus of claim 7, wherein adding the commit with associated metadata to the content repository comprises:

identifying a primary contact;

routing the commit to the primary contact;

determining whether the primary contact approves the commit; and responsive to the primary contact approving the commit, adding the commit with associated metadata to the content repository.

13. The computer program product of claim 1, wherein generating the timeline comprises:

generating a custom timeline relating to a given programming language.

14. The computer program product of claim 1, wherein the timeline is linked to the developer directory.

15. The apparatus of claim 7, wherein generating the timeline comprises:

generating a custom timeline relating to a give programming language.

16. The apparatus of claim 7, wherein the timeline is linked to the developer directory.

* * * * *